United States Patent [19]

De Ceuster et al.

[11] 4,381,969

[45] May 3, 1983

[54] PROCESS FOR THE REGENERATION OF WASTE PAPER

[75] Inventors: Jean De Ceuster, Vilvoorde; Paul Duprez, Brussels, both of Belgium

[73] Assignee: Interox, Brussels, Belgium

[21] Appl. No.: 266,597

[22] Filed: May 22, 1981

[30] Foreign Application Priority Data

May 22, 1980 [FR] France ............................ 80 11479

[51] Int. Cl.³ .............................................. D21C 5/02
[52] U.S. Cl. ......................................... 162/5; 162/6; 162/8
[58] Field of Search ....................... 162/5, 6, 8, 78, 80

[56] References Cited

U.S. PATENT DOCUMENTS

| | | |
|---|---|---|
| 2,505,470 | 4/1950 | Green . |
| 2,505,471 | 4/1950 | Green . |
| 2,505,472 | 4/1950 | Green . |
| 2,505,488 | 4/1950 | Green . |
| 2,505,489 | 4/1950 | Geeen . |
| 3,865,685 | 2/1975 | Hebbel et al. ........................ 162/78 |
| 4,264,412 | 4/1981 | Hasler et al. ........................... 162/5 |
| 4,356,058 | 10/1982 | Fischer et al. .......................... 162/5 |

FOREIGN PATENT DOCUMENTS 2642319 12/1977 Fed. Rep. of Germany .......... 162/5
2422765 11/1979 France .

OTHER PUBLICATIONS

Tappi, vol. 62, No. 7, 7/79, pp. 27–30.

*Primary Examiner*—William F. Smith
*Attorney, Agent, or Firm*—Spencer & Kaye

[57] ABSTRACT

Waste paper containing encapsulated constituents such as inks is bleached by pulping it in the presence of an aqueous alkaline solution which contains a peroxide compound such as hydrogen peroxide.

12 Claims, No Drawings

PROCESS FOR THE REGENERATION OF WASTE PAPER

BACKGROUND OF THE PRESENT INVENTION

The present invention relates to a process for the regeneration of waste paper containing encapsulated constituents, so as to be able to recycle the paper in the form of a pulp. It relates more particularly to a process for the regeneration of waste no-carbon copying paper containing microcapsules.

Papers with encapsulated constituents in general contain compounds such as inks, pigments, dyestuffs or their precursors, covered by a film and in the shape of microcapsules. These papers are capable of producing a coloration when a pressure is applied. They can be obtained by various known techniques, such as those described in U.S. Pat. Nos. 2,505,470, 2,505,471, 2,505,472, 2,505,488 and 2,505,489 filed on Nov. 8, 1947 and assigned to The National Cash Register Co.

It is very awkward to regenerate waste paper of this type. Hitherto, such paper has been disintegrated in an alkaline medium and the pulp thus obtained has been subjected to a flotation treatment to remove from it the microcapsules containing the materials responsible for the coloration.

The paper pulps thus regenerated nevertheless exhibit colorations which vary greatly and are very difficult to remove. In fact, the presence of sodium hydroxide during the disintegration causes an at least partial destruction of the microcapsules, and hence causes the liberation of the materials responsible for the coloration, and accelerates their fixing to the fibres.

To avoid this advantage it has been proposed (French Patent Application No. 79/10,274 filed on Apr. 13, 1979 in the name of J. M. Voith G.m.b.H.) to effect the disintegration of waste paper of this type in the absence of any reactant.

In this case, again, a partial destruction of the microcapsules, by simple mechanical effect, can be observed, with the same disadvantages as in the process described above; alternatively, if the conditions are particularly gentle, only insufficient separation of the fibres is achieved and hence the microcapsules cannot be properly removed during the flotation stage, so that, during the subsequent treatments of the pulp, liberation of the colorants is observed.

SUMMARY OF THE INVENTION

The object of the invention is to provide a process for the regeneration of waste paper containing encapsulated constituents which makes it possible to avoid the disadvantages of the known processes and to obtain a well-ground paper pulp which is not coloured and which has a high degree of whiteness. The process furthermore has the advantage of being very simple to carry out industrially. Finally, the regenerated pulps according to the invention can be used advantageously for the manufacture of printing/writing paper or of tissue paper.

To this effect, the invention relates to a process for the regeneration of waste paper containing encapsulated constituents, which comprises pulping the waste paper with an aqueous alkaline solution, and according to which an aqueous alkaline solution containing a peroxide compound is used for the pulping.

DETAILED DESCRIPTION OF THE INVENTION

The alkaline compound employed for preparing the solutions used according to the invention is selected from amongst the compounds which can give an alkaline pH in water. Amongst these there are especially the hydroxides of alkali metals such as sodium and potassium. Sodium hydroxide is particularly suitable. The total concentration of alkaline compounds in the solution used is in general selected to be greater than 0.8% of the total weight of dry waste paper. Most commonly, it is chosen to be greater than 2.2% of the total weight of waste paper. In general, this concentration is kept at less than 8%. The best results have been obtained with concentrations of between 2.5 and 6%.

All the types of peroxide compounds are suitable for use according to the invention. In general, inorganic peroxide compounds are used. Amongst these, sodium peroxide and hydrogen peroxide are very suitable. Most advantageously, hydrogen peroxide is used. The concentration of peroxide compound is in general chosen to be between 0.1 and 6% and preferably between 0.3 and 3% (calculated as 100% $H_2O_2$) of the weight of dry waste paper. If the peroxide compound has an alkaline character this is taken into account in deciding the concentration of the other alkaline compounds.

The pulping can be carried out in the presence of solutions containing other additives, such as stabilisers for the peroxide compounds, dispersants and sequestering agents. Thus, it is possible to employ carboxylated polymers such as those described in Belgian Pat. No. 850,066 filed on Jan. 4, 1977 in the name of SOLVAY et Cie, or phosphorus derivatives such as the substituted derivative of phosphonic acids, or particulary amino-tri-(methylenephosphonic) acid, 1-hydroxyethylidene-1,1-diphosphonic acid, ethylenediamine-tetra-(methylenephosphonic) acid, hexamethylenediamine-tetra-(methylenephosphonic) acid and diethylenetriamine-penta-(methylenephosphonic) acid, and their alkali metal salts or ammonium salts. These additives are in general employed in an amount of less than 2% and preferably less than 0.5% of the weight of the dry waste paper. Amounts of as little as 0.01% can prove effective.

Sodium silicate, which is a stabiliser for the peroxide compounds which is frequently used in papermaking, can also be employed. In that case, it is in general employed in amounts not exceeding 5% of the weight of the dry waste paper. This additive however has the disadvantage of frequently causing the formation of coloured agglomerates, so that it is preferred to carry out the process substantially in the absence of sodium silicate.

In the process according to the invention, the consistency of the pulp is usually between 0.5 and 10% and preferably between 2 and 8%.

The temperature used during the disintegration is in general selected to be above 50° C. and preferably above 60° C. In general, the temperature chosen is not above 100° C. The best results have been obtained at temperatures of between 65° and 85° C. The duration of the treatment can vary greatly. Usually, this duration is chosen to be between 1 and 100 minutes and preferably between 5 and 60 minutes.

The pulping of the waste paper is usually carried out in a pulper or in any other apparatus which is known per se and is suitable for this use. Examples of apparatus of this type are described in Tappi Monograph Series No. 31, 1967, Deinking Waste Paper.

After pulping the waste paper, the pulp can advantageously be washed once or several times to remove colorants from it. To do so, the pulp is thickened and diluted several times in succession. In general, 2 to 5 successive washes of the pulp are carried out (various types of apparatus known per se, such as drum thickeners, can be used for this purpose).

The wash waters can advantageously be at least partially recycled to the process.

The wash treatments can advantageously be followed by one or more bleaching treatments with sodium hypochlorite, if appropriate interspersed with washing treatments.

For the bleaching with hypochlorite, from 0.5 to 10%, and preferably from 0.8 to 5%, of active chlorine, relative to the weight of dry waste paper, is generally employed. The pH of the mixture is in general chosen to be between 10.5 and 12.5. It can be adjusted to the desired value by introducing small amounts of an alkaline compound such as sodium hydroxide. The consistency of the pulp for this treatment is usually chosen to be between 1 and 25% and most commonly between 3 and 20%. The temperature is in general chosen to be above 25° C. and preferably above 30° C. The process is usually not carried out at above 90° C. Good results have been obtained at temperatures of between 35° and 65° C.

The duration of bleaching can vary greatly; it is usually chosen to be greater than 5 minutes and most commonly greater than 15 minutes. The pulp can be kept in the bleaching tower for a very long time without resulting in any disadvantage whatsoever. However, after 8 hours' residence time, no further significant increase in whiteness is observed. In general, the duration of bleaching does not exceed 5 hours. Good results have been obtained with durations of bleaching of between 20 and 200 minutes. The bleaching with hypochlorite can be carried out in various apparatuses known per se and suitable for this use, such as bleaching towers.

A particularly suitable sequence for regenerating waste paper containing papers with encapsulated constituents comprises the following stages:

(a) pulping the waste paper in a pulper at a temperature of between 65° and 86° C. in the presence of 0.8 to 8% of sodium hydroxide, 0.3 to 3% of hydrogen peroxide and 0.05 to 1% of a stabiliser chosen from amongst the carboxylic polymers and the substituted derivatives of phosphonic acid, the percentages being relative to the weight of dry paper and the consistency of the pulp being from 0.5 to 10%.

(b) washing the pulp at least once, but preferably 2 to 5 times, and (c) bleaching the washed pulp with sodium hypochlorite in amounts corresponding to 0.8-5% of active chlorine relative to the weight of dry paper, at a temperature of between 40° and 65° C. and with a pulp consistency of 3 to 20%.

The pulp treated according to the invention can furthermore—without this being in any way essential—be subjected to one or more treatments such as cleaning, deflaking and refining. In general, the pulp treated according to the invention is subjected to a purification treatment to remove the solid impurities from the pulp. Various apparatus known per se can be used for this purpose, such as cyclones or vibrating sieves.

This cleaning is most commonly carried out immediately after the pulping stage.

In order to illustrate the invention without however limiting its scope, practical embodiments (Experiments 2 and 3) are given below. Experiment 1 was carried out by way of comparison in the absence of hydrogen peroxide in the solution employed in the pulper.

EXAMPLES

The experiments were carried out on waste nocarbon copy paper. The paper was disintegrated in a pulper of the LHOMARGY type, having a capacity of 2 liters.

The paper is shredded manually before being introduced into the pulper. Thereafter, the aqueous solution containing all the constituents except for the hydrogen peroxide is added. The water employed to produce the pulp has a calcium hardness of 10 degrees (German scale). The consistency of the pulp is 4%. The solution is raised to the temperature of the experiment and is mixed with the waste paper for one minute before the hydrogen peroxide is introduced. The treatment in the pulper lasts 30 minutes. After the treatment, a sample is taken in order to measure its whiteness. This is compared with that of $BaSO_4$, the measurement being carried out by means of an ELREPHO (ZEISS) reflectometer equipped with an R 457 filter (standard specification ISO 2470).

The pulp withdrawn from the pulper is filtered until it has a consistency of 25%. It is then diluted with demineralised water to a consistency of 1%, stirred for ten minutes and concentrated to 25%. This operation is repeated twice. The temperature during the three washes is 25° C.

The consistency of the pulp is then adjusted to 15% and the hardness of the water is adjusted to 10 degrees (German scale) (by addition of calcium ions). A tower bleaching with sodium hypochlorite is then carried out for 120 minutes. After bleaching, the pulp is thickened to 25% and a sample is taken for measuring the whiteness. The pulp is then diluted with demineralised water to a consistency of 1%, stirred for ten minutes and concentrated to 25%. A fresh sample is taken for measuring the whiteness.

The nature and concentration of the compounds employed, the working conditions and the results are listed in Table I below.

TABLE I

| Experiment | 1 | 2 | 3 |
|---|---|---|---|
| Pulper | | | |
| NaOH % | 1 | 3 | 3 |
| $H_2O_2$ % | | 1 | 1 |
| Sodium silicate (38° Bé) % | | 2 | |
| DEQUEST 2066* sequestering agent % | | | 0.2 |
| Temperature °C. | 88 | 79 | 79 |
| Initial pH | 11.6 | 12.0 | 12.2 |
| Whiteness °ISO | 45.5 | 61.1 | 60.6 |
| Number of washes | 3 | 3 | 3 |
| Bleaching tower | | | |
| Active chlorine % | 3 | 1.5 | 1.5 |
| NaOH % | 0.15 | 0.15 | 0.15 |
| Temperature °C. | 45 | 48 | 46 |
| pH | 11.8 | 10.7 | 11.8 |
| Whiteness °ISO | | | |
| before washing | 73.5 | 81.6 | 82.7 |

TABLE I-continued

| | | |
|---|---|---|
| after washing | 82.7** | 84.6 |

*DEQUEST 2066 sequestering agent: sodium salt of diethylenetriamine-penta-(methylenephosphonic) acid
**Encrustations of colorants; small green spots present

What is claimed is:

1. Process for the regeneration of waste paper containing encapsulated color constituents, which comprises pulping the waste paper in the presence of an aqueous alkaline solution which contains a peroxide compound to form a pulp, and washing the pulp at least once after pulping the waste paper.

2. Process according to claim 1, wherein the peroxide compound is hydrogen peroxide or sodium peroxide.

3. Process according to claim 2, wherein the peroxide compound is hydrogen peroxide.

4. Process according to any one of claims 1 or 3, wherein the peroxide compound is employed in an amount of 0.3 to 3% of the weight of the dry waste paper.

5. Process according to any one of claims 1 or 3, wherein aqueous alkaline solution contains from 0.8 to 8% of alkaline compounds, relative to the weight of dry waste paper.

6. Process according to claim 5, wherein the aqueous alkaline solution contains more than 2.2% of alkaline compounds with respect to the weight of dry waste paper.

7. Process according to any one of claims 1 to 3, wherein the pulping is carried out at a temperature of between 65° and 85° C.

8. Process according to any one of claims 1 to 3, wherein the aqueous alkaline solution additionally contains a stabiliser for the peroxide compound.

9. Process according to claim 8, wherein the stabilizer for the peroxide compound is chosen from among the carboxylated polymers.

10. Process according to claim 8, wherein the stabilizer for the peroxide compound is chosen from among the substituted derivatives of phosphonic acid.

11. Process according to any one of claims 1 to 3, wherein the aqueous alkaline solution contains sodium hydroxide.

12. Process according to any one of claims 1 to 3, which comprises the following stages:
 (a) pulping the waste paper in a pulper, to a pulp consistency of 0.5 to 10%.
 (b) washing the pulp at least once and
 (c) bleaching the washed pulp with sodium hypochlorite in amounts corresponding to 0.8–5% of active chlorine relative to the weight of dry waste paper.

* * * * *